(12) United States Patent
Van Kamp et al.

(10) Patent No.: US 12,486,353 B2
(45) Date of Patent: Dec. 2, 2025

(54) COMB POLYMER AND USE THEREOF AS DISPERSING AGENT

(71) Applicant: BYK-Chemie GmbH, Wesel (DE)

(72) Inventors: Ina Van Kamp, Wesel (DE); Andreas Okkel, Wesel (DE); Sandra Sabrina Meyer, Wesel (DE); Astrid Rudolfi, Wesel (DE)

(73) Assignee: BYK-Chemie GmbH, Wesel (DE)

( * ) Notice: Subject to any disclaimer, the term of this patent is extended or adjusted under 35 U.S.C. 154(b) by 463 days.

(21) Appl. No.: 17/798,936

(22) PCT Filed: Mar. 4, 2021

(86) PCT No.: PCT/EP2021/055425
§ 371 (c)(1),
(2) Date: Aug. 11, 2022

(87) PCT Pub. No.: WO2021/180553
PCT Pub. Date: Sep. 16, 2021

(65) Prior Publication Data
US 2023/0141337 A1    May 11, 2023

(30) Foreign Application Priority Data
Mar. 9, 2020   (EP) ..................................... 20161841

(51) Int. Cl.
C08G 59/18    (2006.01)
C09D 11/102   (2014.01)
C09D 163/00   (2006.01)

(52) U.S. Cl.
CPC .......... *C08G 59/184* (2013.01); *C09D 11/102* (2013.01); *C09D 163/00* (2013.01); *C08G 2650/50* (2013.01)

(58) Field of Classification Search
CPC .............. C08G 59/184; C08G 2650/50; C08G 59/504; C09D 11/102; C09D 163/00
See application file for complete search history.

(56) References Cited

U.S. PATENT DOCUMENTS

| | | |
|---|---|---|
| 7,312,260 B2 | 12/2007 | Krappe et al. |
| 8,653,222 B2 | 2/2014 | Orth et al. |
| 9,340,641 B2 | 5/2016 | Orth et al. |
| 10,301,486 B2 | 5/2019 | Gobelt et al. |
| 2006/0089426 A1 | 4/2006 | Haubennestel et al. |
| 2017/0292030 A1* | 10/2017 | Göbelt ................ C09D 11/037 |
| 2020/0115497 A1 | 4/2020 | Bessel et al. |

FOREIGN PATENT DOCUMENTS

| | | |
|---|---|---|
| EP | 0200397 A2 | 11/1986 |
| EP | 1486524 A1 | 12/2004 |
| EP | 1650246 A1 | 4/2006 |
| EP | 2199338 A2 | 6/2010 |
| EP | 1745104 B1 | 11/2011 |
| WO | 2005113677 A1 | 12/2005 |
| WO | 2008092687 A1 | 8/2008 |
| WO | 2011070074 A1 | 6/2011 |
| WO | 2016059066 A1 | 4/2016 |
| WO | 2018184961 A1 | 10/2018 |

OTHER PUBLICATIONS

International Search Report and Written Opinion for International Application No. PCT/EP2021/0655425 dated Jun. 14, 2021 (9 pages).

* cited by examiner

*Primary Examiner* — Robert S Jones, Jr.
*Assistant Examiner* — Joshua Caleb Bledsoe

(57) ABSTRACT

The invention relates to a comb polymer having repeating units of at least one of the structures of formulae (I) to (IV) wherein $R^1$ represents a polyoxyalkylene group and A represents an organic group, and wherein the comb polymer has end groups of the general formula (V) wherein $R^2$ and $R^3$ independent of each other are selected from a) organic groups having 1 to 24 carbon atoms and b) $R^1$.

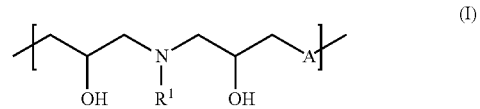

(I)

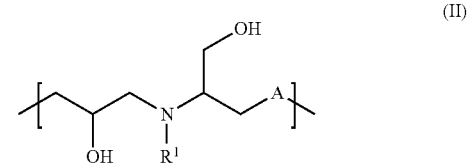

(II)

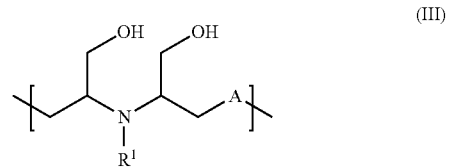

(III)

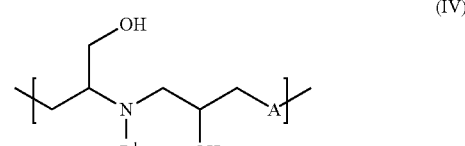

(IV)

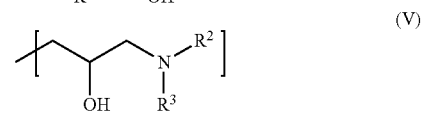

(V)

27 Claims, No Drawings

COMB POLYMER AND USE THEREOF AS DISPERSING AGENT

The invention relates to a comb polymer, a process for preparing the comb polymer, a composition comprising solid particles and the comb polymer, and to the use of the comb polymer as a wetting and/or dispersing agent for solid particles.

WO 2005/113677 A1 describes comb-like polyether alkanolamines in inks. The comb-like polyether alkanolamines are used as water-soluble dispersant for pigments in ink compositions. In one embodiment, the comb-like polyether alkanolamines have secondary amine end groups. In an alternative embodiment, the comb-like polyether alkanolamines have epoxy end groups. Secondary amine groups and epoxy groups are capable of various chemical reactions. In curable compositions the dispersants known from this document may interfere with reactive groups present in curable binder components or crosslinkers. This may impair the performance of the compositions as well as the dispersing ability of the polyether alkanolamines. It also limits the suitability of the known polyether alkanolamines as universal dispersants for a large variety of pigmented compositions.

There is an ongoing need for polymeric dispersing agents which are suitable for a variety of pigmented compositions which show a good ability for wetting and dispersing pigments and fillers. The polymeric dispersing agents should be suitable for different types of pigments, for example organic and inorganic pigments, as well as carbon black. Examples of pigmented compositions include coating compositions, inks, pigment pastes, pigmented master batches, and pigmented polymer compositions.

The invention provides a comb polymer having repeating units of at least one of the structures of formulae (I) to (IV)

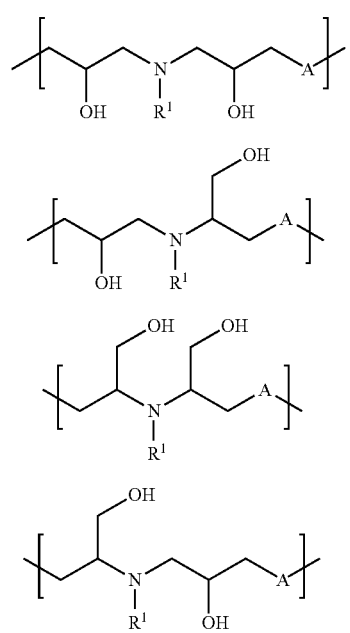

wherein $R^1$ represents a polyoxyalkylene group and A represents an organic group,
and wherein the comb polymer has end groups of the general formula (V)

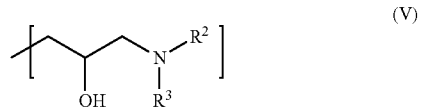

wherein $R^2$ and $R^3$ independent of each other are selected from a) organic groups having 1 to 24 carbon atoms and b) $R^1$.

The comb polymer of the invention is suitable as dispersing agent for a variety of pigmented compositions. The comb polymer generally exhibits a good ability for wetting and dispersing pigments and fillers and is suitable for different types of pigments, for example organic and inorganic pigments, as well as carbon black. The comb polymer is very suitable for use in different pigmented compositions, for example coating compositions, inks, pigment pastes, pigmented master batches, and pigmented polymer compositions. In particular, the comb polymer of the invention provides pigmented compositions having a high transparency, a low viscosity, and good pigment stabilization. For compositions containing carbon black a high jetness is achieved. Jetness means that the surface appearance of the hue has a bluish undertone, which elevates the visual blackness. Generally, a decrease in mean particle size of carbon black pigments leads to an increase in jetness. The jetness can be quantified by the color independent blackness value as the MY value according to DIN 55979. The comb polymer can be used in water-based compositions as well as in non-aqueous compositions.

The polymer of the invention is a comb polymer. Comb polymers consists of an essentially linear main polymer chain, with two or more branch points where pendant polymeric side chains are linked to the main polymer chain. The pendant polymeric side chains are linear or essentially linear.

The comb polymer has repeating units of at least the structures of formulae (I) to (IV), as described above.

The group $R^1$ in formula (I) to (IV) represents a polyoxyalkylene group. The $R^1$ groups form the pending polymer chains in the comb polymer.

It is preferred that $R^1$ comprises repeating units from at least one of oxyethylene, oxypropylene, and oxybutylene. It is particularly preferred that $R^1$ comprises oxyethylene and oxypropylene repeating units. In some embodiments, the repeating units in $R^1$ consist of oxyethylene and oxypropylene. If more than one type of oxyalkylene repeating unit is present in $R^1$, the different types of oxyalkylene repeating units may be arranged in random order. Alternatively, the different types of oxyalkylene units may be arranged in the form of two or more blocks. The groups $R^1$ in individual repeating units of a comb polymer may have the same or a different composition, number of repeating units, and repeating unit distribution. Generally, $R^1$ comprises from 10 to 80 oxyalkylene groups, preferably from 15 to 60 oxyalkylene groups.

In preferred embodiments, the group $R^1$ is terminated by a hydrocarbyl group having 1 to 10 carbon atoms. it is more preferred that $R^1$ is terminated by a lower alkyl group, in particular a methyl-, ethyl-, propyl- or butyl group. Preferably, the terminating hydrocarbyl group is linked to the polyoxyalkylene part of $R^1$ via an ether linkage.

In alternative embodiments, the group $R^1$ is terminated by a hydroxyl group.

Generally, the groups $R^2$ and $R^3$ in general formula (V) do not contain primary or secondary amine groups, and they do not contain epoxide groups.

In preferred embodiments, at least one of $R^2$ and $R^3$ is a hydroxyalkyl group having 2 to 4 carbon atoms, for example a hydroxyethyl group. In some embodiments, one or both of the groups $R^2$ and $R^3$ represent a hydrocarbyl group having 1 to 12 carbon atoms, for example an alkyl group having 2 to 8 carbon atoms. In alternative embodiments, one of the groups $R^2$ and $R^3$ represents a group $R^1$ as defined above.

In a further preferred embodiment $R^2$ is equal to $R^1$ and $R^3$ is a group of formula (VI)

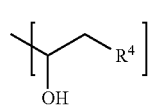

(VI)

wherein $R^4$ is an organic group having 2 to 20 carbon atoms and selected from hydrocarbyl groups, ether groups and ester groups.

The group A in formulae (I) to (IV) represents an organic group. In some embodiments, the group A represents a hydrocarbyl group, for example a hydrocarbyl group having 4 to 40 carbon atoms. Preferably, the hydrocarbyl group has 4 to 20 carbon atoms. The hydrocarbyl group can be a linear or cyclic aliphatic hydrocarbyl group, an aromatic hydrocarbyl group, or an alkylaromatic hydrocarbyl group. In preferred embodiments, A represents an organic group comprising at least one ether group. In further preferred embodiments, A consists of ether groups and hydrocarbyl groups. In this case, the hydrocarbyl groups are generally defined as above.

The comb polymer of the invention comprises tertiary amine groups. In one embodiment, at least a part of the tertiary amino groups of the repeating units of the structures of formulae (I) to (IV) are present in salt form. All or some of the tertiary amine groups may be converted to salts. The tertiary amino groups may, for example, be converted to corresponding ammonium salts by reaction with acids such as carboxylic acids, carboxylic acid derivatives, for example carbonyl halides, or phosphoric acids and acidic esters thereof.

In a further embodiment, at least a part of the tertiary amino groups of the repeating units of the structures of formulae (I) to (IV) have been converted to quaternary ammonium groups.

The quaternary ammonium groups are suitably prepared by quaternization of the tertiary amine group of the repeating units of formulae (I) to (IV) with suitable quaternization agents. Examples of suitable quaternization agents are alkyl halides, benzyl halides, dialkylsulfates, alkyl tosylates, and epoxides. The quaternary ammonium groups generally have anions as counter ions. In preferred embodiments, the counter ions comprise at least one of chloride, bromide, iodide, tosylate, methylsulfate, and carboxylate.

Conversion to salts or quaternization can, for example, increase or adjust the compatibility of the comb polymer with respect to particular media or affect the interaction with solid particles such as pigments and/or fillers.

In the comb polymer, the sum of the repeating units of the structures of formulae (I), (II), (III), and (IV) is generally in the range of 2 to 25, preferably in the range of 4 to 20, more preferably in the range of 3 to 10.

The comb copolymer generally has a number average molecular weight in the range of 4000 to 100000 g/mol, preferably in the range 6000 to 50000 g/mol. The number-average molecular weight $M_n$ and the weight-average molecular weight $M_w$ can be determined in accordance with DIN 55672-1:2007-08 by means of gel permeation chromatography using tetrahydrofuran containing 1% by volume of dibutylamine as eluent and polystyrene as calibration standard.

It is preferred that the comb polymer of the invention has a low content of epoxide groups or is essentially free or free of epoxide groups. Generally, the comb polymer has an epoxide equivalent weight of at least 10000 g/mol, preferably at least 20000 g/mol, or even 50000 g/mol or higher. When the comb polymer is entirely free of epoxide groups, the epoxide equivalent weight is infinite. The epoxide equivalent weight can be determined by titration, for example as described in standard method ASTM D 1652-97.

Is further preferred that the comb polymer of the invention has low content of primary and secondary amine groups, or is essentially free of free of such groups. Generally, the comb polymer has a combined content of primary and secondary amine groups of at most 10 mg KOH/g, preferably at most 5 mg KOH/g, or at most 1 mg KOH/g. When the comb polymer is entirely free of primary and secondary amine groups, their combined content is 0 mg KOH/g. The content of primary and secondary amine groups, in the presence of tertiary amines groups, can be determined as described in standard method ISO 9702:1996.

The invention further relates to a process for preparing the comb polymer of the invention. The process comprises reacting
  a) a diepoxide and a primary monoamine of the formula $R^1$—$NH_2$, wherein the molar ratio of epoxide groups to amine active hydrogens of the primary monoamine is not equal to 1:1, and
  b) a monoepoxide of the formula (VII)

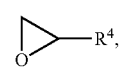

(VII)

if a molar excess of amine active hydrogens is employed in a), or a secondary amine of the formula $HNR^2R^3$, if a molar excess epoxide groups is employed in a),
wherein $R^1$, $R^2$, $R^3$, and $R^4$ are defined as above.

The reaction of epoxides and amines can be carried out at ambient temperature or at elevated temperature, for example on the range of 20° C. to 200° C. If so desired, the reaction may be carried out in the presence of a catalyst, for example a basic catalyst.

Suitable diepoxides to be used in the process include are compounds having two epoxide groups. Preferred diepoxides are diglycidylethers of aliphatic and aromatic alcohols. Such diglycidylethers are commercially available. They are suitably formed by reacting reactive phenols or alcohols with epichlorohydrin. Alternatively, diepoxides can be prepared by epoxidation reaction of compounds having two olefinic double bonds. Preferably the diepoxides used in the present invention are selected from the group consisting of glycidyl ethers, like bisphenol A diglycidyl ether, bisphenol F diglycidyl ether, hydrogenated bisphenol A diglycidyl ether, hydrogenated bisphenol F diglycidyl ether, oligomeric and polymeric diglycidylethers based on bisphenol A and/or Bisphenol F and/or hydrogenated bisphenol A and/or hydrogenated Bisphenol F, 1,3-propane-, 1,4-butane- or 1,6-hexanediol-diglycidyl ether and polyalkylenoxide glycidyl ether; glycidyl esters, like hexahydrophthalic acid diglycidyl ester; cycloaliphatic epoxides, like 3,4-epoxycyclohexyl-epoxyethane or 3,4-epoxycyclohexylmethyl-3,4-epoxy-cyclohexane carboxylate.

Preferred examples of diepoxides are those based on bisphenol A, bisphenol F, or aliphatic and cycloaliphatic diols and epichlorohydrin, having a molecular weight between 300 and 5000 g/mol.

Suitable monoamines $R^1$—$NH_2$ are commercially available from Huntsman under the trade designation Jeffamine® M. Specific commercials products include Jeffamine® M-600, Jeffamine® M-1000, Jeffamine® M-2005, Jeffamine® M-2070, Jeffamine® M-2095, and Jeffamine® M-3085. Other suitable monoamines are also available from Huntsman under the trade designation Surfonamine®.

As mentioned above, the diepoxide and the primary monoamine of the formula $R^1$—$NH_2$, are employed in amounts that the molar ratio of epoxide groups to amine active hydrogens of the primary monoamine is not equal to 1:1.

In one embodiment, a molar excess of diepoxide based epoxide groups over amine active hydrogens of the primary monoamine is used. In this case, the molar ratio of ratio of epoxide groups to amine active hydrogens of the primary monoamine generally is in the range of 1.00:0.95 to 1.00:0.60, preferably 1.0:0.90 to 1.0:0.70.

If a molar excess of epoxide groups over amine active hydrogens of the primary monoamine is used, a secondary amine of the formula $HNR^2R^3$ is employed as well. Generally, the secondary amine is employed in an amount sufficient to ensure that the comb polymer is free or essentially free of epoxide groups. Examples of suitable secondary amines are dialkylamines, such as dimethyl amine, diethyl amine, di-n-propyl amine, di-iso-propyl amine, di-n-butyl amine, di-iso-butyl amine, diamyl amine, diisoamyl amine, di-n-hexyl amine, di-n-heptyl amine, di-n-octyl amine, dinonyl amine, didodecyl amine, di(2-ethylhexyl) amine, didoceyl amine, dicyclohexyl amine, diphenyl amine, dibenzyl amine, diallyl amine, piperidine, morpholine, methyl ethyl amine, methyl propyl amine, ethyl hexyl amine, or butyl octyl amine.

Preferred secondary amines are alkanolamines, for example diethanol amine, dipropanol amine, ethyl ethanol amine, methyl ethanol amine, ethyl propanol amine, and the like.

In some embodiments, the secondary amine may have a one or more tertiary amine groups.

Examples of such compounds are $N^1,N^1,N^3$-trimethyl-1,3-propanediamine, $N^1,N^1$-diethyl-$N^3$-methyl-1,3-propanediamine, $N^1,N^1$-diethyl-$N^3$-methyl-1,3-propanediamine, $N^1,N^1$-dimethyl-$N^3$-propyl-1,3-butanediamine, $N^3$-[3-(dimethylamino)propyl]-$N^1,N^1$-dimethyl-1,3-propanediamine, and $N^3$-[3-(diethylamino)propyl]-$N^1,N^1$-diethyl-1,3-propanediamine.

In an alternative embodiment, a molar excess of amine active hydrogens of the primary monoamine over epoxide groups is used. In this case, the molar ratio of ratio of epoxide groups to amine active hydrogens of the primary monoamine generally is in the range of 0.95:1.00 to 0.60:1.00, preferably 0.70:1.0 to 0.90:1.0.

If a molar excess of amine active hydrogens of the primary monoamine over epoxide groups is used, a monoepoxide of the formula (VII) is employed as well. Generally, the monoepoxide is employed in an amount sufficient to ensure that the comb polymer is free or essentially free of primary and secondary amine groups. Examples of suitable monoepoxides include epoxidized olefins, glycidylethers of monoalcohols, and glycidylesters. Specific compounds include aliphatic, cycloaliphatic, aromatic and/or araliphatic glycidyl ether, glycidyl ester and olefin oxides like C1-C20-alkyl glycidyl ether, phenyl glycidyl ether, cresyl glycidyl ether, naphthyl glycidyl ether, butyl glycidyl ether, p-tert.-butyl-phenyl glycidyl ether, 2-ethyl-hexyl glycidyl ether, C12-C14-glycidyl ether, allyl glycidyl ether, 2,3-epoxypropylneodecanoate (Cardura® E 10, Resolution Performance Products), C4-C20-olefine oxides like 1,2-octene oxide, 1,2-nonene oxide, 1,2-undecene oxide, 1,2-dodecene oxide, 1,2-octadecene oxide, 4-methyl-1,2-pentene oxide, 1,2-butene oxide, propene oxide, ethylene oxide, styrene oxide, butadiene monoxide, isoprene monoxide, cyclopentene oxide and/or 2-ethyl-1,2-butene oxide.

The reaction can be carried out in one or more reaction steps.

In one embodiment, the diepoxide and primary monoamine are mixed to have a molar excess of epoxide groups over amine active hydrogens of the primary monoamine, and the mixture is reacted in a first step until essentially all primary amine groups have been converted to tertiary amine groups, followed by a second step wherein a secondary amine is added and reaction is continued until essentially all epoxide groups have been consumed. Alternatively, the diepoxide, the primary monoamine, and the secondary amine may be combined and reacted in a single step to form the comb polymer of the invention.

In a different embodiment, the diepoxide and primary monoamine are mixed to have a molar excess of amine active hydrogens of the primary monoamine over epoxide groups, and the mixture is reacted in a first step until essentially all epoxide groups have reacted, followed by a second step wherein a monoepoxide is added and reaction is continued until essentially all amine groups have been converted to tertiary amine groups. Alternatively, the diepoxide, the primary monoamine, and the monoepoxide may be combined and reacted in a single step to form the comb polymer of the invention.

The comb polymer of the invention is very suitable as a wetting and/or dispersing agent for solid particles. Therefore, the invention also relates to a composition comprising solid particles and the comb polymer according to the invention. Preferred examples of solid particles are pigments and fillers. The invention further relates to the use of the comb polymer as a wetting and/or dispersing agent for solid particles.

Representative examples of solid particles include pigments, fillers, flame retardants, and fibers.

The pigments may be those known to a skilled person. The pigments may be organic pigments or inorganic pigments as well as carbon black.

Examples of suitable organic pigments include mono-, di-, tri- and polyazo pigments, oxazine, dioxazine, thiazine pigments, diketo pyrrolopyrroles, phthalocyanines, ultramarine and other metal complex pigments, indigoid pigments, diphenylmethane pigments, triarylmethane pigments, xanthene pigments, acridine pigments, quinacridone pigments, methine pigments, anthraquinone, pyranthrone, perylene pigments and other polycyclic carbonyl pigments.

When the solid particles to be dispersed are organic pigments, improved results have been obtained with comb polymers In some embodiments, the pigments are carbon black pigments and/or pigments based on carbon black, such as graphite or carbon nanotubes. When carbon black is to be dispersed, improved results have been obtained with respect to viscosity reduction. Also an increase in transparency, a reduction of particle size and improvement of jetness indicate a better dispersion.

In a further embodiment, the pigments are inorganic pigments, such as zinc, titanium dioxide, zinc oxide, zinc sulfide, zinc phosphate, barium sulfate, lithophones, iron oxide, ultramarine, manganese phosphate, cobalt aluminate, cobalt stannate, cobalt zincate, antimony oxide, antimony sulfide, chromium oxide, zinc chromate, mixed metal oxides based on nickel, bismuth, vanadium, molybdenum, cadmium, titanium, zinc, manganese, cobalt, iron, chromium, antimony, magnesium, aluminum (for example, nickel titanium yellow, bismuth vanadate molybdate yellow or chromium titanium yellow).

In some embodiments, the pigments include corrosion inhibiting pigments. Examples of suitable corrosion inhibiting pigments are those known in the art and include zinc oxide, phosphates, such as zinc phosphate, zinc powder, and platelet shaped pigments, such as iron oxide.

Inorganic pigments can be magnetic pigments based on pure iron, iron oxides and chromium oxides or mixed oxides, metallic effect pigments of aluminum, zinc, copper or brass as well as pearlescent pigments or fluorescent and phosphorescent pigments Examples of powdery or fibrous fillers include those, which are composed of powdery or fibrous particles of alumina, aluminum hydroxide, silica, diatomaceous earth, siliceous earth, quartz, silica gel, talc, kaolin, mica, perlite, feldspar, slate flour, calcium sulfate, barium sulfate, calcium carbonate, calcite, dolomite, glass or carbon.

Solid particles include flame retardants, such as aluminum or magnesium hydroxide, and matting agents, such as silicas.

The weight ratio of comb polymer to solid particles is not particularly critical. For organic pigments, 10 to 50% by weight of comb polymer, calculated on the weight of the organic pigment, may suitably be employed. For inorganic pigments, 1 to 30% by weight of comb polymer, calculated on the weight of the inorganic pigment, may suitably be employed.

In case of very finely divided pigments, for example some carbon blacks, 30 to 90% by weight of comb polymer, calculated on the weight of the finely divided pigment, may be employed.

The composition can suitably be employed in areas wherein solid particles are dispersed in a composition, for example coatings, paints, plastics, pigment pastes, sealants, ceramics, cosmetics, adhesives, casting compounds, fillers, battery applications, gas and oilfield applications, spackling compounds, inks and printing inks, and flat panel displays.

The invention also relates to a process of dispersing solid particles, comprising the steps of
a) Mixing at least one type of solid particles, and the comb polymer of the invention in a dispersion medium, and
b) Exerting shear force to the mixture prepared in step a).

The process can be carried out in a conventional way of dispersing solid particles, as it is well known, for example in the industries concerned with coating compositions or casting compositions. The dispersion medium may be a liquid, for example an organic solvent or water. Alternatively, the dispersion medium may be a resin or polymer, for example a film forming binder. The resin or polymer may optionally be dissolved in a liquid diluent.

Examples of suitable resins or polymers include synthetic, semisynthetic or natural macromolecular substances, such as polyvinyl chloride, saturated or unsaturated polyesters, polyurethanes, polystyrene, polyacrylates, polyamides, epoxy resins, and polyolefins, such as polyethylene or polypropylene, cellulose nitrate, cellulose acetobutyrate, alkyd resins, and melamine resins.

EXAMPLES

Raw Materials Used:
Epikote 828 is an aromatic diepoxide from Hexion
Jeffamine M 2070 is a polyetheramine from Huntsman Corporation
DABCO is a catalyst from Air products
2,2'-Iminodiethanol supplied by BASF SE
Dibutylamine supplied by Sigma Aldrich
Dibenzylamine supplied by Sigma Aldrich
N-benzylmethylamine supplied by Sigma Aldrich
Epalloy 5001LC is an aliphatic diepoxide from Emerald Performance Materials
Grilonit RV 1814 is an C13/C15 alkyl glycidylether from EMS Griltech
Oxirane, 2-[(2-methylphenoxy)methyl]- is supplied by Dow Termination with Secondary with Secondary Amine Preparation Example 1

45 g Epikote 828 and 193 g Jeffamin M 2070 were combined and stirred for 6 hours at 140° C. under N$_2$-atmosphere until only two epoxide groups were detected per polymer by 1H-NMR (integrated). After two hours, 0.25 g DABCO were added as catalyst. Afterwards, 5 g 2,2'-Iminodiethanol are were added and the reaction mixture was stirred for an additional 6 hours at 140° C. until no epoxide groups were detected by 1H-NMR. An amber, clear, viscous polymer was obtained.

Preparation Example 2

45 g Epikote 828 and 193 g Jeffamin M 2070 were combined and stirred for 6 hours at 140° C. under N$_2$-atmosphere until only two epoxide groups were detected per polymer by 1H-NMR (integrated). After two hours, 0.25 g DABCO were added as catalyst. Afterwards, 6 g dibutylamine were added and the reaction mixture was stirred for an additional 6 hours at 140° C. until no epoxide groups were detected by 1H-NMR. An amber, clear, viscous polymer was obtained.

Preparation Example 3

45 g Epikote 828 and 193 g Jeffamin M 2070 were combined and stirred for 6 hours at 140° C. under N$_2$-atmosphere until only two epoxide groups were detected per polymer by 1H-NMR (integrated). After two hours, 0.25 g DABCO were added as catalyst. Afterwards, 5 g dibenzylamine were added and the reaction mixture was stirred for an additional 6 hours at 140° C. until no epoxide groups were detected by 1H-NMR. An amber, clear, viscous polymer was obtained.

Preparation Example 4

45 g Epikote 828 and 193 g Jeffamin M 2070 were combined and stirred for 6 hours at 140° C. under N$_2$-atmosphere until only two epoxide groups were detected per polymer by 1H-NMR (integrated). After two hours, 0.25 g DABCO were added as catalyst. Afterwards, 6 g N-benzyl-methylamine were added and the reaction mixture was stirred for an additional 6 hours at 140° C. until no epoxide groups were detected by 1H-NMR. An amber, clear, viscous polymer was obtained.

Preparation Example 5

32 g Epalloy 5001LC and 124 g Jeffamin M 2070 were combined and stirred for 6 hours at 140° C. under $N_2$-atmosphere until only two epoxide groups were detected per polymer by 1H-NMR (integrated). After two hours, 0.15 g DABCO were added as catalyst. Afterwards, 3.2 g 2,2'-Iminodiethanol are were added and the reaction mixture was stirred for an additional 6 hours at 140° C. until no epoxide groups were detected by 1H-NMR. An amber, clear, viscous polymer was obtained.

In preparation Examples 1 to 5 the molar ratio of epoxide groups to amine active hydrogens of the primary monoamine to the amine active hydrogens of the secondary amine was 10:8:2.

Termination with Monoepoxide

Preparation Example 6

30 g Epikote 828 and 193 g Jeffamin M 2070 were combined and stirred for 6 hours at 140° C. under $N_2$-atmosphere until no epoxide groups were detected per polymer by 1H-NMR (integrated). Afterwards, 4.5 g Grilonit RV 1814 were added and the reaction mixture was stirred for an additional 6 hours at 140° C. until no epoxide groups were detected by 1H-NMR. An amber, clear, viscous polymer was obtained.

Preparation Example 7

30 g Epikote 828 and 193 g Jeffamin M 2070 were combined and stirred for 6 hours at 140° C. under $N_2$-atmosphere until no epoxide groups were detected per polymer by 1H-NMR (integrated). Afterwards, 2.3 g Oxirane, 2-[(2-methylphenoxy)methyl]- were added and the reaction mixture was stirred for an additional 6 hours at 140° C. until no epoxide groups were detected by 1H-NMR. An amber, clear, viscous polymer was obtained.

All examples had the same ratio of epoxide groups belonging to the diepoxide to amine active hydrogens of the primary monoamine to epoxide groups belonging to the monoepoxide (8:10:2).

Comparative Preparation Examples (1) According to patent EP 1 745 104 B1, preparation 7 (Huntsman)
(2) Material described in EP 1 486 524 B1 was prepared by combining 30 g Epikote 828, 193 g Jeffamin M 2070 and 0.2 g DABCO. The reactants were stirred for 12 hours at 140° C. under N2-atmosphere until no epoxide groups were detected per polymer by 1H-NMR (integrated). An amber, clear, viscous polymer was obtained. The ratio of epoxide groups to amine active hydrogens was 10:12.

Application Examples

To evaluate the effectiveness of the inventive polymers as pigment dispersants, they were tested in different coating compositions.

Application Example 1: Laropal Dispersion

As first step, pigment concentrates with different pigments were made with an inorganic pigment (Bayferrox 130M) and a carbon black pigment (Special Black 4). The components shown in Table 1 were combined and dispersed in a Lau-Disperser with 1 mm glass beads to create the pigment concentrates (2 hours for Bayferrox 130M, 4 hours for Special Black 4).

TABLE 1

Composition of the pigment concentrates. Laropal A 81 is an aldehyde resin from BASF SE, GARAMITE 7305 is a clay-based rheology additive from BYK-Chemie GmbH, Bayferrox 130M is a micronized iron oxide red pigment from LANXESS, Special Black 4 is a carbon black pigment from Orion Engineered Carbon.

| Raw material | Pigment Concentrate 130M | Pigment Concentrate Sp. Black 4 |
| --- | --- | --- |
| Laropal A 81 60% | 12.50 | 10.60 |
| 2-Propanol, 1-methoxy-, acetate | 22.60 | 27.40 |
| Inventive or comparative polymers | 4.50 | 4.00 |
| GARAMITE 7305 | 0.40 | |
| Bayferrox 130M | 60.00 | |
| Special Black 4 | | 8.00 |
| | 100.00 | 50.00 |

The viscosities of the pigment concentrates were measured one day after grinding. The viscosities and the particle size of the pigment concentrates using the polymers of preparation examples 1 and 5 (present invention) and comparative example 1 are shown in Table 2 below. The viscosity was measured with an Anton Paar rheometer ((25 mm 0, 1°, 23° C.) at high shear rates.

TABLE 2

Viscosities of samples of pigment concentrate Bayferrox 130M for high (100 1/s) shear rates.

| Polymer sample | mPa s at 100 1/s—after 1 d RT Pigment Concentrate 130M |
| --- | --- |
| Comp. Example 1 | 431.4 |
| Example 1 | 282.4 |
| Example 5 | 148.8 |

The inventive samples showed a better viscosity reduction than the comparative example for the pigment concentrate with the inorganic exemplary pigment.

TABLE 3

Viscosities of samples of pigment concentrates Special Black 4 for high (100 1/s) shear rates.

| Polymer sample | mPa s at 100 1/s—after 1 d RT Pigment Concentrate Sp. Black 4 |
| --- | --- |
| Comparative Example 1 | 42.7 |
| Example 1 | 29.8 |
| Example 5 | 22.6 |

The viscosity for carbon black also improved with the inventive products indicating that the dispersion ability improved also for the exemplary organic pigment.

Letdown

To form the final coating composition, the pigment concentrate was combined with the letdown and hardener with the composition shown in table 4 and 5. The mixing ratio of the three components is shown in table 6. After application on the panel, the coating is cured for 30 min at 60° C. after 60 minutes flash off time.

TABLE 5

Composition of hardener

| Component | Ratio |
|---|---|
| Desmodur N75 | 25.00 |
| Butyl acetate | 8.70 |
| Solvent naphtha (petroleum), light arom. | 8.80 |
| 2-Propanol, 1-methoxy-, acetate | 2.50 |
| Xylene | 5.00 |
| | 50.00 |

TABLE 4

Composition of letdown

| Component | Ratio |
|---|---|
| Macrynal SM 510 | 75.00 |
| Xylol | 6.60 |
| Solvent Naphtha | 5.00 |
| Butyl acetate | 8.00 |
| 2-Propanol, 1-methoxy-, acetate | 5.00 |
| BYK-066N | 0.30 |
| BYK-306 | 0.10 |
| | 100.00 |

Macrynal SM 510 is an acrylic resin from Allnex, BYK-066N is a silicone defoamer from BYK-Chemie GmbH, BYK-306 is a surface-active additive from BYK-Chemie GmbH, Desmodur N75 is an isocyanate hardener from Covestro AG.

Mixing Ratio

TABLE 6

Mixing ratio of Pigment concentrate, letdown and hardener.

| Pigment Concentrate | Let-Down | 130M | SBlack 4 | Hardener | Sum |
|---|---|---|---|---|---|
| 130M | 17.3 | 4.0 | | 8.7 | 30.0 |
| Sp. Black 4 | 18.1 | | 2.8 | 9.1 | 30.0 |

Results

To evaluate the efficiency of dispersion of the pigment concentrates, the transparency was assessed and haze as well as gloss were measured. The transparency was assessed by visual valuation. The coating was applied on a PET-foil (50 μm wire bar) and held against a light source. Haze and gloss of the coating was measured on the same foil with a BYK haze-gard for the haze measurement and the BYK-micro-haze plus for the gloss (20° angle). The results are summarized in table 7.

TABLE 7

Results of transparency, transmission, haze and gloss measurement for Special Black 4 coating.

| Coating sample | Transparency Sp. Black 4 | Haze Sp. Black 4 | Gloss Sp. Black 4 |
|---|---|---|---|
| Comparative Example 1 | 3 | 19 | 85 |
| Example 1 | 1-2 | 16 | 86 |
| Example 5 | 1-2 | 16 | 86 |

The transparency improved significantly with the inventive products, showing that the dispersion quality increased. The haze of the coating is low while the gloss is good in all cases.

To evaluate the efficiency of dispersion of the pigment concentrate 130M, a rub out test was performed. After storage, the paint is applied on a contrast test chart by use of a frame applicator (100 μm wire bar). The Rub-up-test is carried out by rubbing a finger on the surface of the paint (about ⅓ of the applied area) until there is a certain resistance against the rubbing and the color difference between the rubbed and the untreated area reaches the highest value and stays constant. After drying, an evaluation of the color difference is performed with a Spectro Guide Sphere Gloss (20° Angle).

TABLE 8

Results of Rub-Out (Delta-E, b*-value and Gloss) for Bayferrox 130M coating

| Coating sample | Delta-E Bayferrox 130M | Gloss Bayferrox 130M |
|---|---|---|
| Comparative Example 1 | 1.13 | 93 |
| Example 1 | 0.96 | 93 |
| Example 5 | 0.68 | 93 |

The dispersion quality and thus the Delta-E values of the Rub-Out improved with the inventive products. Especially Example 5 shows a low delta-e value and thus a good dispersion and stabilization of the pigment. The gloss is good in all cases.

Application Example 2: Epoxy Coating System

For the second type of coating composition, all liquid components (Epikote 1001 X75, exemplary polymer and BYK-052 N) were combined in a pot and located under a grinding vessel (4 cm tooth plate). The solid components (Bayferrox 130M, Blanc Fixe N and GARAMITE 7305) were stirred in with a low mixing rate. After complete addition, the components were dispersed for 30 minutes at 50° C. and 8500 rpm. Afterwards, the solvent mixture was added. The curing agent was added before application of the coating composition.

TABLE 9

Coating composition of epoxy coating example. Epikote 1001 X75 is a solid epoxy resin from Hexion, BYK-052 N is a defoamer from BYK-Chemie GmbH, Blanc Fixe N is a barium sulfate whit pigment from Solvay, MIBK is a solvent from Eastman, iso-Butanol is a solvent from Dow, Epikure 3115 X70 is a polyamide based curing agent from Hexion.

| Raw materials | 2-pack-Epoxy Coating |
|---|---|
| Epikote 1001 X75 | 128.00 |
| Inventive or comparative polymers | 1.80 |
| BYK-052 N | 1.00 |
| Bayferrox 130M | 15.00 |
| Blanc Fixe N | 110.60 |
| GARAMITE 7305 | 1.60 |
| Grinding vessel, 50° C., 30 min, 8500 rpm, 4 cm-Tooth plate | |
| MIBK/iso-BuOH 7:3 | 42.00 |
| | 300.00 |
| Epikure 3115 X70 | 45.00 |
| | 345.00 |

Viscosity

The viscosities of the coating composition without the curing agent using dispersant examples 1, 5 (present invention) and comparative examples 1 and 2 are shown in Table 10 below. The viscosity was measured with an Anton Paar rheometer ((25 mm 0, 1°, 23° C.) at different shear rates. The measurement was repeated after 7 d and the quotient of the viscosities for a shear rate 100 1/s recorded as storage index.

TABLE 10

Viscosities of samples for high (100 1/s), medium (10 1/s) and low (1 1/s) shear rates.

| Sample | mPa s at 1 1/s—after 1 d RT | mPa s at 10 1/s—after 1 d RT | mPa s at 100 1/s—after 1 d RT | Storage Index at 100 1/s |
|---|---|---|---|---|
| Comparative Example 1 | 2869 | 1467 | 1037 | 1.13 |
| Comparative Example 2 | 2564 | 2027 | 1734 | 0.86 |
| Example 1 | 2156 | 1708 | 1465 | 1.04 |
| Example 5 | 1658 | 1295 | 1084 | 1.08 |

The viscosity of the inventive examples is lower for low shear rates. That leads to a better handling even with "bad" grinding conditions. The storage stability of the coating is furthermore enhanced which is reflected by the storage index. The same tendencies are found for low shear rates.

To evaluate the efficiency of dispersion of the pigment concentrate 130M, a rub out test was performed. After storage, the paint is applied on a contrast test chart by use of a frame applicator (100 μm wire bar). The Rub-Out-test is carried out by rubbing a finger on the surface of the paint (about ⅓ of the applied area) until there is a certain resistance against the rubbing and the color difference between the rubbed and the untreated area reaches the highest value and stays constant. After drying, an evaluation of the color difference is performed with a Spectro Guide Sphere Gloss.

TABLE 11

Results of Rub-Out for the epoxy coating.

| Sample | Delta-E |
|---|---|
| Comparative Example 1 | 1.02 |
| Comparative Example 2 | 0.58 |
| Example 1 | 0.54 |
| Example 5 | 0.51 |

The Delta-E values show that the Rub-Out and thus the dispersion efficiency is improved with the inventive polymers.

Application Example 3: Aqueous Ink

Water, biocide, defoamer and inventive or comparative polymer were combined and dispersed in a Lau-Disperser with 1 mm glass beads for 16 hours to prepare pigment concentrates.

TABLE 13

Composition of the pigment concentrate for aqueous inks. Acticide MBS is a biocide from Lanxess, BYK-019 is a defoamer from BYK-Chemie GmbH, Emperor 1800 is a carbon black pigment from the Cabot Corporation.

| Component | Pigment Concentrate |
|---|---|
| Water | 37.25 |
| Inventive or comparative polymers | 5.00 |
| Acticide MBS | 0.05 |
| BYK-019 | 0.20 |
| Emperor 1800 | 7.50 |
| | 50.00 |

The viscosities and the particle size of the pigment concentrates using dispersant examples 1, 2, 3, 4, 6, 7 (present invention) and comparative example 2 are shown in Table 14 below. The viscosity was measured with an Anton Paar rheometer (measurement system CP 50, T=25° C.) at a constant shear rate of 100 s$^{-1}$. The particle size of the pigment concentrates was measured with a NanoPlus DLS particle analyzer micromeritics). For this purpose 0.05 g of the pigment concentrate was diluted with 12.5 g water.

TABLE 14

Viscosity and Particle Size of the pigment concentrate.

| | Viscosity | | | Particle size |
|---|---|---|---|---|
| | initial mPas | after storage mPas | Storage Index | after storage D50 [nm] |
| Comparative Example 2 | 14.3 | 12.4 | 0.87 | 62 |
| Example 1 | 11.0 | 10.8 | 0.98 | 59 |
| Example 2 | 12.1 | 11.5 | 0.95 | 60 |
| Example 3 | 11.5 | 11.1 | 0.97 | 59 |
| Example 4 | 11.5 | 10.9 | 0.95 | 56 |
| Example 6 | 12.7 | 12.7 | 1.00 | 60 |
| Example 7 | 10.3 | 9.9 | 0.96 | 62 |

As can be seen, the polymer of the invention is much more effective at dispersing carbon black than the comparative example, as reflected by a lower viscosity. Furthermore, the storage stability improved significantly with the inventive products even without having a resin in the pigment paste. The particle size is comparable or better in most cases.

Application Example 4: Aqueous Carbon Black Dispersion

For the pigment concentrate, the raw materials shown in table 15 are mixed while stirring and the pH adjusted to 8.2-8.5 with Dimethylethylamine (10% solution in water) before grinding. The mixture is ground in a LAU Disperser DAS 200 for 4 hours with glass beads (1.0-1.2 mm) ratio=1:1 (by weight). After grinding, the pH is checked and if needed again adjusted to 8.2-8.5 with Dimethylethylamine (10% solution in water).

TABLE 15

Composition of pigment concentrate. BYK-011 is a defoamer from BYK-Chemie GmbH, Raven 5000 UIII is a carbon black pigment from Birla Carbon.

|  | [%] |
|---|---|
| Deionized water | 82.2 |
| Inventive or comparative polymers | 7.0 |
| BYK-011 | 0.8 |
| Raven 5000 UIII | 10.0 |
|  | 100.0 |

The letdown is prepared by combining the raw materials shown in table 16 while stirring. The pigment concentrate is added to the letdown and the viscosity is adjusted to the spray out viscosity with demineralized water (~700 mPa*s Brookfield Viscometer at 50 rpm). The mixing ratio of pigment concentrate and letdown is shown in table 17.

TABLE 16

Composition of letdown. Setaqua 6801 is an acrylic binder from Allnex, Setaqua 6802 is an acrylic binder from Allnex, BYK-028 is a defoamer from BYK-Chemie GmbH, BYK-348 is a silicone surfactant from BYK-Chemie GmbH, BYK-425 is a rheology additive from BYK-Chemie GmbH.

| Let-down | [%] |
|---|---|
| Setaqua 6801 | 23.8 |
| Setaqua 6802 | 44.9 |
| BYK-028 | 0.6 |
| Dimethylethylamine 10% in water | 2.0 |
| Deionized water | 13.5 |
| Butylglykol | 5.7 |
| BYK-348 | 0.5 |
| BYK-425 5% in water | 9.0 |
|  | 100.0 |

TABLE 17

|  | [%] |
|---|---|
| Pigment Concentrate | 13.3 |
| Let-down | 86.7 |
|  | 100.0 |

The base coat is applied by hand on coil-primed aluminum panels with a spray gun (HVLP 3000, 1.3 mm nozzle) at 2 bar. The panel is cured by 30 min flash off at RT.

To evaluate the quality of dispersion, the jetness of the base coat was measured with a BYK-Gardner spectro guide 45/0.

|  | My | dM | Mc |
|---|---|---|---|
| Comparative Example 2 | 259 | 10 | 269 |
| Example 1 | 264 | 11 | 275 |
| Example 2 | 264 | 10 | 274 |
| Example 7 | 266 | 9 | 274 |

It can be seen, that the Mc as well as the My values are higher for the inventive samples, indicating a good dispersion. The Undertone dM which is a indicator for the bluishness of the coating is good for all samples.

The invention claimed is:

1. A process for preparing a comb polymer having repeating units of at least one of the structures of formulae (II) to (IV)

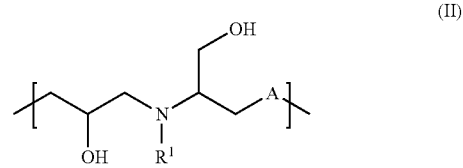

(II)

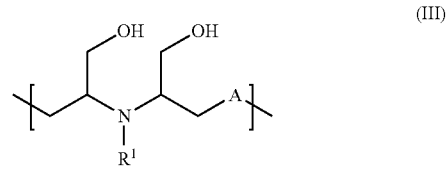

(III)

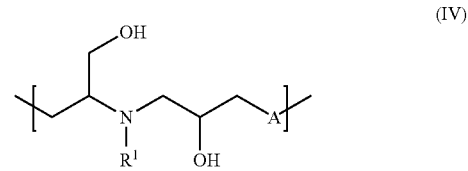

(IV)

wherein $R^1$ represents a polyoxyalkylene group and A represents an organic group, and wherein the comb polymer has end groups of the general formula (V)

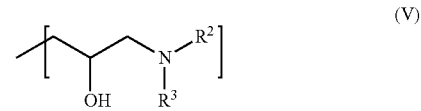

(V)

wherein $R^2$ and $R^3$ independent of each other are selected from a) organic groups having 1 to 24 carbon atoms and b) $R^1$, the process comprising reacting
  a) a diepoxide and an amine, wherein the molar ratio of epoxide groups to amine active hydrogens of the amine is not equal to 1:1, and
  b) a monoepoxide of the formula (VII)

(VII)

if a molar excess of amine active hydrogens is employed in a), or a secondary amine of the formula $HNR^2R^3$, if a molar excess epoxide groups is employed in a), wherein the amine in a) consists of primary monoamines of the formula $R^1$—$NH_2$ where $R^1$ represents is a polyoxyalkylene group terminated by a hydrocarbyl group having 1 to 10 carbon atoms or by a hydroxyl group, R² and R³ independent of each other are selected from a) organic groups having 1 to 24 carbon atoms and b)R,-and R⁴ is an organic group having 2 to 20 carbon atoms and selected from hydrocarbyl groups, ether groups and ester groups.

2. A comb polymer, made by the process of claim 1 having repeating units of at least one of the structures of formulae (II) to (IV)

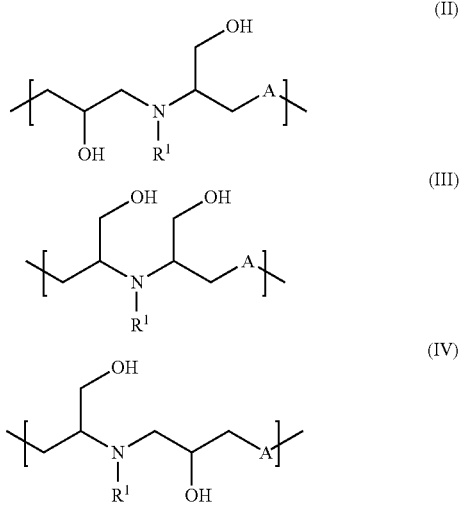

wherein R¹ represents a polyoxyalkylene group and A represents an organic group,
and wherein the comb polymer has end groups of the general formula (V)

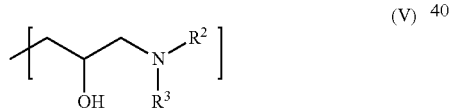

wherein R² and R³ independent of each other are selected from a) organic groups having 1 to 24 carbon atoms and b) R¹.

3. The comb polymer according to claim 2, wherein at least one of R² and R³ is a hydroxyalkyl group having 2 to 4 carbon atoms.

4. The comb polymer according to claim 2, wherein R² is equal to R¹ and R³ is a group of formula (VI)

wherein R⁴ is an organic group having 2 to 20 carbon atoms and selected from hydrocarbyl groups, ether groups and ester groups.

5. The comb polymer according to claim 2, wherein R¹ comprises repeating units from at least one of oxyethylene, oxypropylene, and oxybutylene.

6. The comb polymer according to claim 2, wherein R¹ is terminated by a hydrocarbyl group having 1 to 10 carbon atoms.

7. The comb polymer according to claim 2, wherein A comprises at least one ether group.

8. The comb polymer according to claim 2, wherein A consists of ether groups and hydrocarbyl groups.

9. The comb polymer according to claim 2, wherein the sum of the repeating units of the structures of formulae (II), (III), and (IV) is in the range of 3 to 25.

10. The comb polymer according to claim 2, wherein the comb copolymer has a number average molecular weight in the range of 6000 to 50000 g/mol.

11. The comb polymer according to claim 2, wherein the comb polymer has an epoxide equivalent weight of at least 10000 g/mol.

12. The comb polymer according to claim 2, wherein the comb polymer is substantially free of epoxide groups and wherein the comb polymer is substantially free of primary and secondary amine groups.

13. The comb polymer according to claim 2, wherein at least a part of the tertiary amino groups of the repeating units of the structures of formulae (II) to (IV) are present in salt form.

14. The comb polymer according to claim 2, wherein at least a part of the tertiary amino groups of the repeating units of the structures of formulae (II) to (IV) have been converted to quaternary ammonium groups.

15. A composition comprising solid particles and the comb polymer according to claim 2.

16. The composition according to claim 15, wherein the solid particles comprise at least one of pigments and fillers.

17. A process of dispersing solid particles in a dispersion medium comprising
a) Mixing solid particles and the comb polymer according to claim 1 in a dispersion medium, and
b) Exerting shear force to the mixture prepared in a).

18. A particle dispersion comprising the comb polymer according to claim 1, a dispersion medium, and solid particles.

19. A comb polymer having repeating units of at least one of the structures of formulae (I) to (IV)

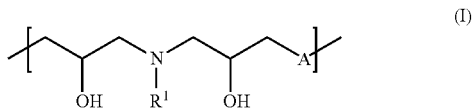

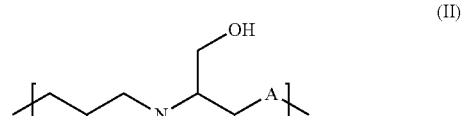

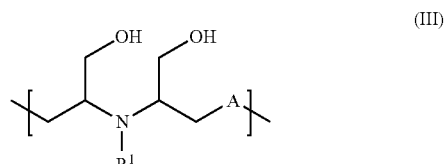

-continued

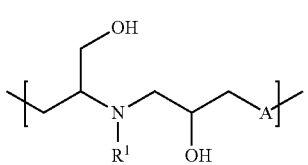
(IV)

wherein $R^1$ represents a polyoxyalkylene group and A represents an organic group, and wherein the comb polymer has end groups of the general formula (V)

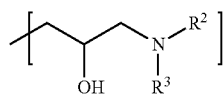
(V)

wherein $R^2$ is equal to $R^1$ and $R^3$ is a group of formula (VI)

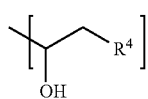
(VI)

wherein $R^4$ is an organic group having 2 to 20 carbon atoms and selected from hydrocarbyl groups, ether groups and ester groups.

20. The comb polymer according to claim 19, wherein $R^1$ comprises repeating units from at least one of oxyethylene, oxypropylene, and oxybutylene.

21. The comb polymer according to claim 19, wherein $R^1$ is terminated by a hydrocarbyl group having 1 to 10 carbon atoms.

22. The comb polymer according to claim 19, wherein A comprises at least one ether group.

23. The comb polymer according to claim 19, wherein the sum of the repeating units of the structures of formulae (I), (II), (III), and (IV) is in the range of 3 to 25.

24. The comb polymer according to claim 19, wherein the comb copolymer has a number average molecular weight in the range of 6000 to 50000 g/mol.

25. The comb polymer according to claim 19, wherein at least a part of the tertiary amino groups of the repeating units of the structures of formulae (I) to (IV) are present in salt form.

26. A composition comprising solid particles and the comb polymer according to claim 19.

27. A particle dispersion comprising the comb polymer according to claim 19, a dispersion medium, and solid particles.

* * * * *